March 29, 1966 — W. S. PETERSON — 3,242,586
MULTIPLE SPOUTED BED
Filed Aug. 27, 1962 — 2 Sheets-Sheet 1

Inventor
William S. Peterson
By Stevens, Davis, Miller & Mosher
Attorneys

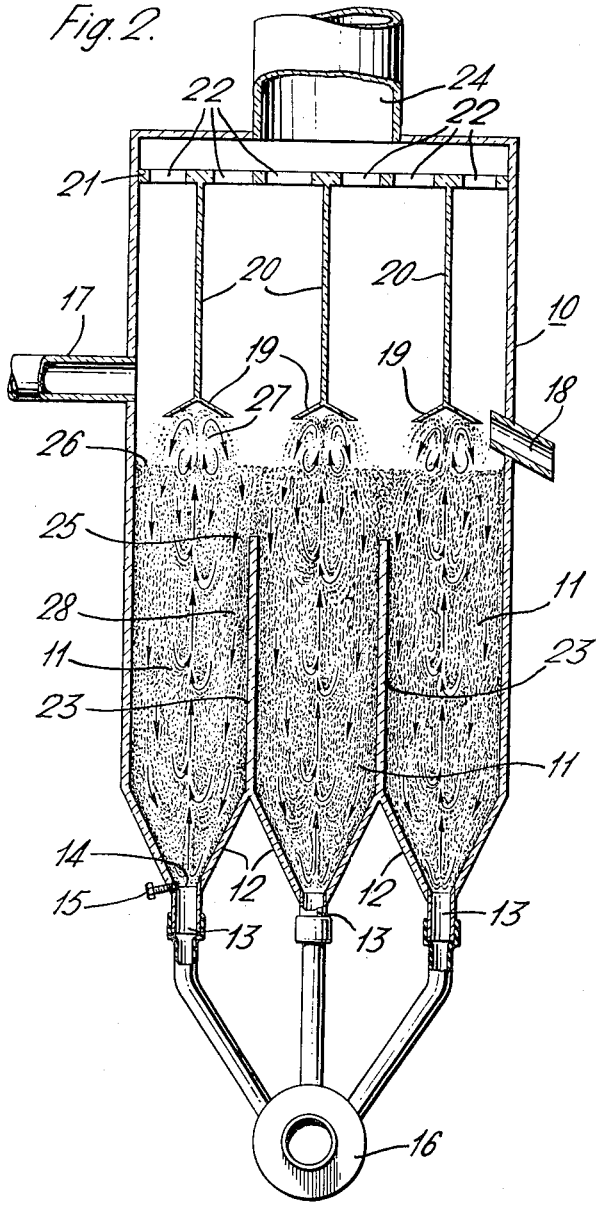

United States Patent Office 3,242,586
Patented Mar. 29, 1966

3,242,586
MULTIPLE SPOUTED BED
William S. Peterson, Ottawa, Ontario, Canada, assignor to National Research Council, Ottawa, Ontario, Canada, a corporation of Canada
Filed Aug. 27, 1962, Ser. No. 219,584
6 Claims. (Cl. 34—57)

This invention relates to a large capacity spouted bed. The method of spouting beds of granular material too coarse to be fluidized is described in U.S. Patent No. 2,786,280 issued March 26, 1957 to Gishler and Mathur.

The application of the spouted bed technique for commercial purposes, e.g. drying of grains and other materials, generally requires a unit with a rather large capacity and output. However, as the single spouted bed is increased in size the circulation velocity of solids becomes lower, and, if grain is being dried for example, such grain would likely become scorched, for it would take too long a time for the grain to move from the hotter section near the bottom of the column to the top of the column.

Multiple spouts within the same bed were then contemplated to increase turnover and capacity but uniform success was not achieved. Difficulties were encountered in properly distributing gas to the spouts, and on lateral transfer of gas from one spout to another.

The problems are overcome in the present invention which provides a multiple spouted bed comprising a vessel; means for admitting solid particles to said vessel to form a bed of solids within said vessel; means for discharging solid particles from said vessel; a plurality of fluid inlet means at the bottom of said vessel; means connected to each of said inlet means for admitting fluid to said vessel; means for permitting the escape of fluid from said vessel; and a plurality of air-tight vertical baffles extending from the bottom of said vessel a major distance of the height of the bed within said vessel, whereby to divide said vessel into a plurality of compartments; whereby, upon contacting said particles within each of said compartments with a jet of fluid the major portion of which moves substantially vertically upwardly through a bed of said particles, said particles in each of said compartments are carried upwardly in dilute suspension and thus form, as the minor volume of the bed in each compartment, a well-defined, continuous relatively rapid upward spout lying adjacent the general line of direction of said jet, said upwardly carried material then falling downwardly and outwardly to form, as the major volume of the bed in each said compartment, a downwardly, relatively slowly moving, annular, columnar, loosely packed body, the depth of said bed in each said compartment normally being greater than the longest dimension of a horizontal cross-section of the columnar body in each said compartment, the downwardly moving particles in said columnar body following substantially vertical downward paths having a slight inward inclination and thereby continuously migrating to, and being upwardly spouted in, said spout at all levels along the height of said spout in each of said compartments. The baffles should preferably extend from ½ to ⅞ of the height of the bed, with a range of from ⅔ to ¾ being normally preferred. The usual fluid used in the bed is hot air but other gases or vapors such as steam and other applications than drying are possible—such as reduction, roasting etc.

In drawings which illustrate an embodiment of the present invention,

FIGURE 2 is a vertical cross-section of the bed of FIGURE 1.

Figure 1:
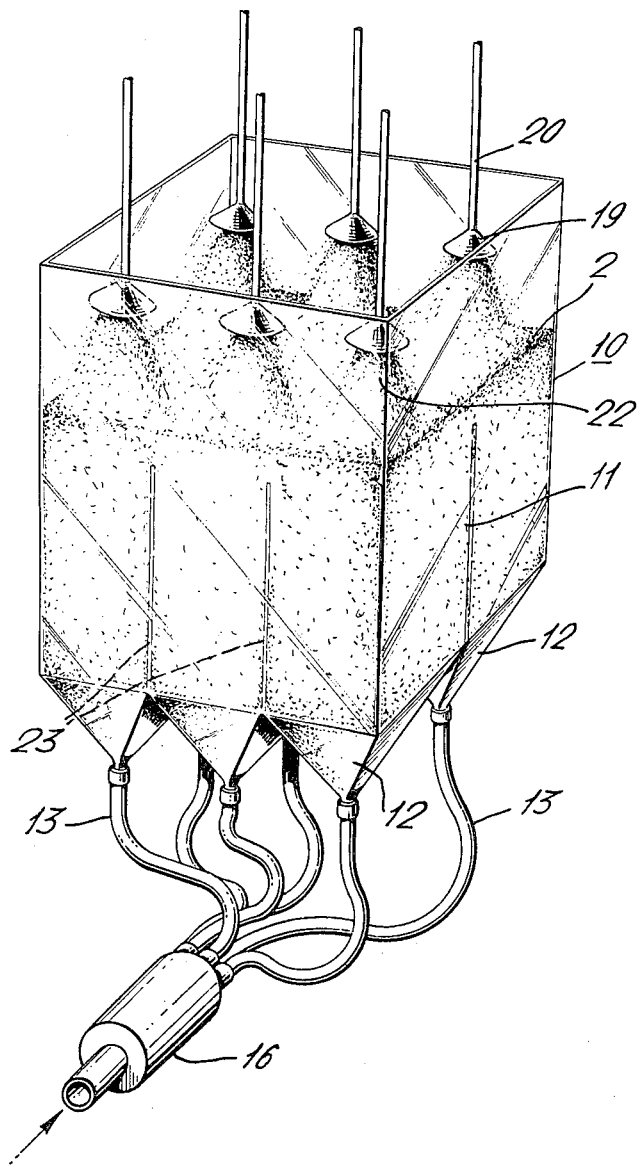
FIGURE 1 is a perspective view of a sextuple spouted bed.

The apparatus of the present invention as seen in FIGURES 1 and 2 comprises a vessel, indicated generally at 10, divided into six compartments 11 and provided with a plurality of pyramidal shaped bottom portion 12 and an air inlet line 13 for each of the pyramidally shaped bottom portions 12. However, it is appreciated that the multiple spouter could have (round) cones instead of pyramids and the compartments could be other than rectilinear. As shown in FIGURE 2 each of the cones is provided with a tilted but generally horizontal screen 14 to prevent material being spouted from falling into the hot air inlet. The screens are not located in the small diameter air inlet 13 itself due to excessive back pressure developed, but are located below the inlet in the enlarged part of the pipe. They are tilted so as to drain solids to the capped tube 15. These screens are only used in case of air failure when they prevent the pipes from filling with solids. They also provide a convenient way of draining the solids from the vessel. Actually, the multi-spouted columns used in the laboratory had no screens in the air line. The air inlet lines are of equal length and are connected to a common source of air 16.

The vessel is provided with inlet means 17 for the admission of material to be treated, and an outlet chute 18. Depending from the vessel vertically above the air inlet means 13 are a plurality of conical deflectors 19, fixed to rods 20, which, in turn, are mounted to the vessel 10 by any suitable means, as by means of a plate 21 provided with perforations 22. Some movement of the deflectors is permissible or desirable to aid centering of the spout. The vessel is divided into a plurality of compartments 11 by means of vertical baffles 23. Air is permitted to escape from the vessel through an outlet conduit 24.

When the multiple spouted bed is in operation, there are a plurality of columns 25, wherein a minor portion of the material to be treated is rapidly propelled upwardly to break through the upper surface 26 of the bed in a spout 27. The major portion of the bed 28 consists of a slowly downwardly moving inwardly migrating column concentric with upwardly moving column 25.

It will be observed that FIGURE 1 is in highly idealized form and does not show screen 14, outlet tubes 15, inlet means 17, outlet means 18, perforated plate 21 nor columns 25.

It is preferred that the air lines to the bed be such that the air paths be identical. The supply of air to each individual spout should be such not only to keep the spouts of equal height, but also to assure that the flow ratios between the spouts be kept constant over a range of flows. This latter feature is more particularly advantageous during start-up. It was also found desirable to have the air inlets unobstructed, except by the screens heretofore described, in order to avoid high or dissimilar pressure drops. It is preferable to omit the screens also if this is possible but they have been used on the single spout commercial driers.

Filling of the bed and start-up procedure may be facilitated by the insertion, from above, of conical plugs (not shown in the drawings) into each air inlet. Then, in start-up, the air flow may be gradually increased as the conical plugs are gradually withdrawn. In order to prevent bed material from entering the air inlet pipes, the conical plugs should be reinserted before the air is shut off. With the conical plugs in use the screens could almost certainly be omitted.

It has also been found advantageous to use the conical spout deflectors 19. This prevents blow-out of bed material during start-up and also induces material to fall back to the appropriate part of the bed. In addition the deflectors 19 may be used to monitor individual spout performance.

The vertical baffles 23, which are an essential part of the apparatus of the present invention must be air-tight to prevent lateral transfer of air from the columns 19. It is not possible to state with precision the baffle heights, for this is dependent not only on the height of the bed to be spouted but also on the diameter of the bed. Nevertheless, it has been found that, for a 3 foot diameter bed of height 24" with 3 air inlets, it was not possible to spout the bed with all three spouts operating, in the absence of vertical baffles. However, when the column was divided into three sections with 12" high baffles, it was possible to operate three spouts simultaneously.

In general terms, however, it is preferred that the baffle height be from about ⅔ to about ¾ of the height of the bed to be spouted.

In a triple spouter, each section being 6" x 10" in cross-section, according to the present invention, the following are typical operating conditions for the spouting of dry wheat: air flow, 225 s.c.f.m.; pressure at distributor, 2 p.s.i. (55" water column of which 15" water due to bed); particle velocity at wall, about 4.2 f.p.m.:

A sextuple spouter according to the present invention was also put into operation. It consisted of two rows, each with three spouts, and was divided by vertical, air tight baffles extending 12" above the cone, i.e. 16" above the air inlet, into six individual compartments 8" by 8" square with a 1" diameter air inlet to the centre of each compartment. Typical operating conditions for the sextuple spouter were: Incipient spouting air flow, 537 s.c.f.m.; pressure at distributor, 55½" water (of which 12½" due to bed); minimum spouting, 465 s.c.f.m.; average particle velocity at wall, 5½ f.p.m. (5% above minimum spouting).

A large triple spouter according to the present invention in a three foot diameter column was also put into operation. The column was divided into three equal sectors by vertical air tight baffles extending 12" above the bottom, i.e. 16" above the air inlet, with a 2½ diameter air inlet in the centre of each sector. The column had a flat bottom, and screens were used over the air inlet. A shallow (two foot high) bed of wheat was spouted in this column.

It was first tried to operate the column with an air distributor in which the air paths were not similar for the three air inlets. It was not possible to operate the three spouts simultaneously. However, reduction of the air inlets of the distributor to 1½" diameter in order to obtain the major amount of pressure drop, with a distributor pressure of about 90" water at 945 s.c.f.m. air was successful.

The air distributor was then redesigned so that the air paths were similar. With 2½" diameter air inlets, successful operation was achieved with a pressure of 28" water at 960 s.c.f.m. with the same bed depth.

I claim:

1. A multiple spouted bed comprising: a vessel; means for admitting solid particles to said vessel to form a bed of solids within said vessel but incompletely filling said vessel; means for discharging solid particles from said vessel; a plurality of fluid inlet means at the bottom of said vessel; means connected to each of said inlet means for admitting fluid to said vessel; means for permitting the escape of fluid from said vessel; a plurality of air-tight vertical baffles extending from the bottom of said vessel a distance of one-half to seven-eighths of the height of the bed within said vessel, whereby to divide said vessel into a plurality of compartments in which one of said inlet means is situated at the centre of each of said compartments, said compartments covering the entire cross-sectional area of said vessel, each said compartment containing said solid particles; a plurality of frusto-conical deflectors at the top of said vessel whereby to provide a deflector over each said compartment within said vessel, the lowest portion of said deflectors being adapted to be slightly above the level of the bed; whereby, upon contacting said particles within each of said compartments with a jet of fluid, the major portion of which moves substantially vertically upwardly through a bed of said particles, said particles in each of said compartments are carried upwardly in dilute suspension and thus form, as the minor volume of the bed in each compartment, a well-defined, continuous relatively rapid upward spout lying adjacent the general line of direction of said jet, said upwardly carried material then striking said frusto-conical deflector, being directed downwardly thereby falling downwardly and outwardly to form, as the major volume of the bed in each said compartment, a downwardly, relatively slowly moving, annular, columnar, loosely packed body, the depth of said bed in each said compartment normally being greater than the longest dimension of a horizontal cross-section of the columnar body in each said compartment, the downwardly moving particles in said columnar body following substantially vertical downward paths having a slight inward inclination and thereby continuously migrating to, and being upwardly spouted in, said spout at all levels along the height of said spout in each of said compartments.

2. A multiple spouted bed as claimed in claim 1 wherein the fluid is heated air.

3. A multiple spouted bed as claimed in claim 1 wherein the fluid is steam.

4. A multiple spouted bed comprising: a vessel; means for admitting solid particles to said vessel to form a bed of solids within said vessel but incompletely filling said vessel; means for discharging solid particles from said vessel; a plurality of fluid inlet means at the bottom of said vessel; means connected to each of said inlet means for admitting fluid to said vessel; means for permitting the escape of fluid from said vessel; a plurality of air-tight vertical baffles extending from the bottom of said vessel a distance of one-half to seven-eighths of the height of the bed within said vessel, whereby to divide said vessel into a plurality of compartments in which one of said inlet means is situated at the centre of each of said compartments, said compartments covering the entire cross-sectional area of said vessel, each said compartment containing said solid particles; a plurality of frusto-conical deflectors at the top of said vessel whereby to provide a deflector over each said compartment within said vessel, each said deflector being situated along an imaginary vertical extension of a selected one of said inlet means, the lowest portion of said deflectors being adapted to be slightly above the level of the bed; whereby, upon contacting said particles within each of said compartments with a jet of fluid the major portion of which moves substantially vertically upwardly through a bed of said particles, said particles in each of said compartments are carried upwardly in dilute suspension and thus form, as the minor volume of the bed in each compartment, a well-defined, continuous relatively rapid upward spout lying adjacent the general line of direction of said jet, said upwardly carried material then striking said frusto-conical deflector, being directed downwardly thereby falling downwardly and outwardly to form, as the major volume of the bed in each said compartment, a downwardly, relatively slowly moving, annular, columnar, loosely packed body, the depth of said bed in each said compartment normally being greater than the longest dimension of a horizontal cross-section of the columnar body in each said compartment, the downwardly moving particles in said columnar body following substantially verticall downward paths having a slight inward inclination and thereby continuously migrating to, and being upwardly spouted in, said spout at all levels along the height of said spout in each of said compartments.

5. A multiple spouted bed as claimed in claim 4 wherein the fluid is heated air.

6. A multiple spouted bed as claimed in claim 4 wherein the fluid is steam.

References Cited by the Examiner
UNITED STATES PATENTS

| | | | |
|---|---|---|---|
| 2,876,557 | 3/1959 | Ducatteau | 34—57 |
| 2,968,683 | 1/1961 | Kossman. | |
| 3,028,681 | 4/1962 | Jorman | 34—57 |

WILLIAM F. O'DEA, *Primary Examiner.*

NORMAN YUDKOFF, *Examiner.*

ALDEN D. STEWART, W. C. EVERETT, D. A. TAMBURRO, *Assistant Examiners.*